Dec. 1, 1942.  W. R. NEW  2,303,381
GAS TURBINE POWER PLANT AND METHOD
Filed April 18, 1941  2 Sheets—Sheet 1

INVENTOR
WINSTON R. NEW.
BY
ATTORNEY

Patented Dec. 1, 1942

2,303,381

UNITED STATES PATENT OFFICE 2,303,381

GAS TURBINE POWER PLANT AND METHOD

Winston R. New, Springfield, Pa., assignor to Westinghouse Electric & Manufacturing Company, East Pittsburgh, Pa., a corporation of Pennsylvania Application April 18, 1941, Serial No. 389,107

9 Claims. (Cl. 60—41)

The invention relates to the conversion of thermal energy of motive fluid, comprised of gaseous products of combustion, into useful mechanical or electrical energy and it has for an object to provide, for this purpose, a method wherein expansion of compressed and heated products of combustion from a higher super-atmospheric pressure to a lower super-atmospheric pressure, with useful energy recovery, and subsequent recompression from the lower super-atmospheric pressure to the higher super-atmospheric pressure involve circulation in a closed system, wherein hot products of combustion of the same composition as the first-named products of combustion are mixed with the latter when compressed to provide the heat, wherein an exchange of heat takes place between the expanded and recompressed currents of motive fluid before heat is added from fuel by mixture of new and recirculated combustion products as aforesaid, and wherein expanded products of combustion are cooled incident to compression.

A further object of the invention is to provide a method for developing power wherein expansion of compressed and heated products of combustion from the higher super-atmospheric pressure to a lower super-atmospheric pressure to convert thermal energy into mechanical energy, and compression from the lower to the higher pressure involve circulation in a closed system, and wherein a portion of the compressed and heated products of combustion is utilized to provide hot products of combustion of the same composition as the first-named products of combustion for mixture with the latter when compressed to produce the heated and compressed products of combustion, and the expanded products of combustion are cooled incident to compression.

A further object of the invention is to provide a gas turbine plant wherein products of combustion at pressures above atmospheric are continuously circulated and recirculated in a system together with a combustion device supplied with combustion media and discharging hot products of combustion directly into the circulating stream of products of combustion of like composition in order to heat the latter.

Gas turbine plants of the open and closed types are old in the prior art. In the open type, a compressor receives air at atmospheric pressure, compresses the air and then furnishes the compressed air to combustion apparatus from which products of combustion are supplied to a turbine, the turbine driving the compressor and also furnishing excess useful power.

In the closed type, air or gas, under pressure above atmospheric, is continuously circulated and recirculated in a closed circuit. Heat is added from an outside source through suitable metal conductive walls. The heated air or gas expands in at least one turbine and it is recompressed in at least one compressor, the gas or air being cooled incident to compression. A regenerator may be provided for the exchange of heat between the expanded and compressed currents of working fluid. In accordance with my invention, features of these two systems are brought together to provide a novel type of power plant. Accordingly, therefore, a more particular object of the present invention is to reserve to the closed system, essential for high capacity and small size, the advantages of the open system with respect to direct heat addition by combustion within the working fluid itself and supported by a medium, for example, air, which is independent of or separate from the circulating working fluid so that the combustion products may mix with the working fluid to heat the latter.

These and other objects are effected by the invention as will be apparent from the following description and claims taken in accordance with the accompanying drawings, forming a part of this application, in which:

Figure 1:
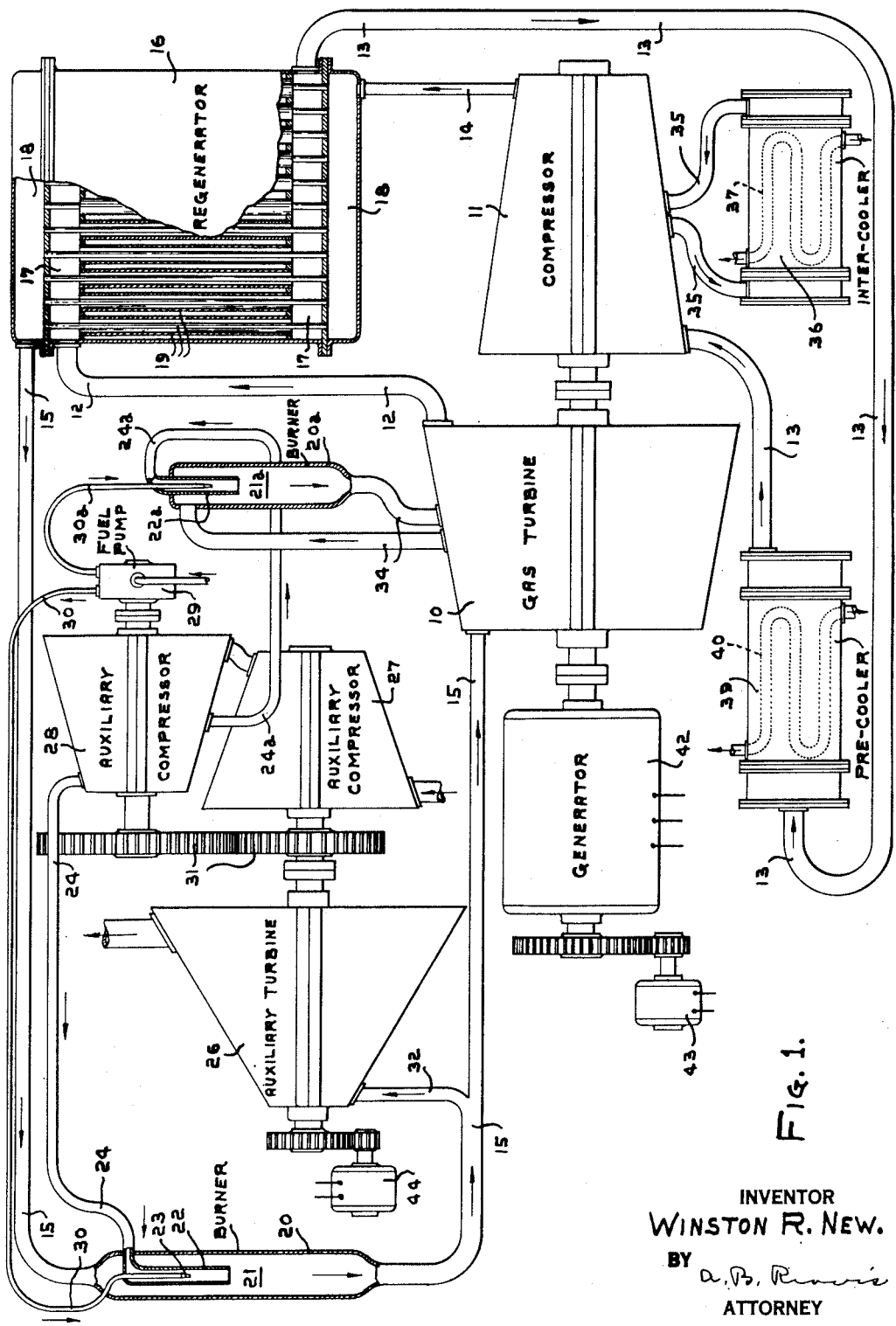
Fig. 1 is a diagrammatic view of the improved power plant.

Referring to the drawings more in detail, the multiple-stage turbine 10 drives the multiple-stage compressor 11, the turbine and the compressor being included in a closed system or circuit including the conduits 12, 13, 14 and 15 and the regenerator 16. The conduit 12, the space 17 of the regenerator, and the conduit 13 provide a passage for supplying working fluid exhausting from the turbine to the inlet of the compressor; and the conduit 14, the space 18 of the regenerator, and the conduit 15 provide a passage for returning working fluid from the compressor outlet to the inlet of the turbine.

The spaces 17 and 18 of the regenerator are separated by heat conductive metal walls 19, the latter serving to transfer heat from the working fluid exhausted from the turbine to the compressor to the compressed working fluid discharged from the latter to the turbine.

After the recovery of exhaust heat by the working fluid discharging from the compressor to the turbine, the compressed working fluid is heated by internal firing, and then the compressed and heated working fluid is admitted to the turbine for expansion therein in order that thermal energy of the working fluid may be converted into useful mechanical energy. Accordingly, the conduit 15 has a section 20 of larger diameter forming a mixing chamber within which is arranged a burner or combustion apparatus, at 21, the latter operating to complete combustion without depending upon the main stream of motive fluid for that purpose.

The combustion apparatus or burner, at 21, includes a combustion tube 22 supplied with suitably atomized fuel by the jet 23 and with air by the conduit 24, and hot products of combustion are discharged from the tube into the section or chamber 20 in order to mix with the main stream of working fluid and raise the temperature of the latter. As shown, the burner discharges axially of the enlarged conduit section 20, and the air supplied by the conduit 24 entirely supports combustion of the contiguously-supplied atomized fuel. Thus, the fuel undergoing combustion is encompassed by the stream of compressed products of combustion and there occurs very effective admixture of new hot products of combustion with the recirculated products to raise the temperature thereof.

To provide fuel and air at a suitable pressure so that products of combustion may be discharged into the high-pressure working fluid stream of like composition, there is shown an auxiliary turbine 26 driving a multiple-stage compressor, shown as being comprised by the compressor units 27 and 28 and a fuel pump 29 for furnishing liquid fuel, by means of a pipe 30, to the jet 23. If possible, the compressor unit 28 and the fuel pump 29 may be directly connected to the auxiliary turbine 26 instead of employing gearing 31.

The auxiliary compressor apparatus compresses air received from the atmosphere to the desired pressure and it is driven by the auxiliary turbine supplied with compressed working fluid which is primarily heated, that is, fluid heated by a burner, the working fluid so supplied giving up heat energy to operate the auxiliary turbine before being exhausted from the latter to the atmosphere. In Fig. 1, the auxiliary turbine 21 is shown as being supplied by a branch conduit 32 connected to the supply conduit 15 between the burner apparatus, at 21, and the inlet of the main turbine 10.

Figure 2:
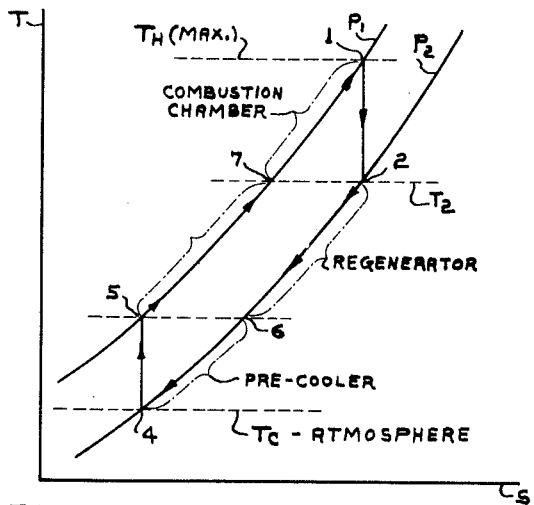
Figs. 2, 3 and 4 are temperature-entropy diagrams.

The functioning of the component parts of the system so far described is best revealed by reference to the idealized temperature-entropy diagram of Fig. 2, the process 1—2 representing isentropic (frictionless adiabatic) expansion in the turbine from the maximum allowable temperature $T_H = T_1$ to the temperature $T_2$. Irreversibilities inherent in the heat rejection and addition processes 2—6—4 and 5—7—1, respectively, are reduced to the extent of thermal regeneration between the fluid streams traversing the conditions of state 2—6 and 5—7 in a counterflow heat exchanger. The process 6—4 corresponds to precooling of the working fluid before admission to the compressor, and the process 7—1 corresponds to heat addition from the source (combustion) to the working fluid, following addition of heat thereto in the regenerator. The cycle so far described has a relatively poor thermal efficiency because of the limited extent to which regeneration is possible; and, to obtain the desired efficiency, two or more stages of compression with precooling and intercooling and possibly two or more stages of expansion with reheating may be used.

By employing many stages of compression and expansion (if the complication could be justified) the actual cycle might be made to approach close to the Ericsson cycle consisting of two constant pressure lines and two isothermals. This completely regenerative cycle is shown in Fig. 3 and it has the limiting (Carnot) efficiency for the temperature range available, $$E = 1 - \frac{T_C}{T_H}$$

this being the maximum obtainable efficiency in any self-acting process.

Figure 3:
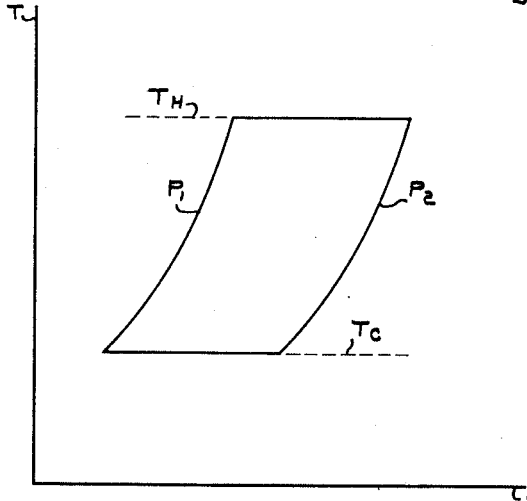
Figure 4:
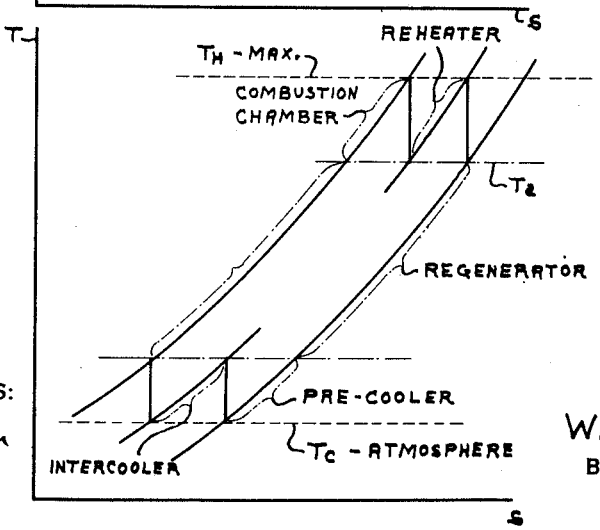

While the maximum thermal efficiency can be attained only with an infinite number of reheating and intercooling stages leading to a temperature-entropy diagram, as in Fig. 3, the efficiency is greatly improved with only a single stage of reheating and a single stage of intercooling, as in Fig. 4, where the extended possibility of thermal regeneration and consequent reduction in irreversible heat addition and rejection is at once apparent in comparison with Fig. 2.

In Fig. 1, a conduit 34 provides a loop passage for supplying working fluid from a preceding stage to a succeeding stage of the turbine. Likewise, the compressor has a loop conduit 35 for supplying working fluid from a preceding to a succeeding stage thereof.

The conduit 34 has a larger section 20a providing a mixing chamber within which is arranged the burner or combustion apparatus, at 21a, the burner having fuel and air supplied thereto by means of the conduits 30a and 24a.

The conduit 35 is constructed and arranged to provide a chamber 36 within which is arranged any suitable cooling coil 37.

Following the regenerator 16, the supply conduit 13 includes a chamber 39 with a cooling coil 40 therein to provide for precooling of working fluid admitted to the compressor.

The turbine 10 carries any suitable external load, for example, the alternator 42, which is directly connected thereto. Motors 43 and 44 are provided for starting the plant.

The power plant described operates as follows: The main system is closed, as exhaust combustion gases from the turbine are compressed and returned to the inlet thereof. The gases flowing to the turbine inlet from the compressor are heated regeneratively by exhaust gases flowing from the turbine to the compressor. After regenerative heating, primary heating of the compressed gases is effected by hot products of combustion of like composition supplied into the main stream by means of a suitable burner furnished with fuel and air by the fuel pump and auxiliary compressor, respectively.

As the auxiliary turbine for driving the auxiliary compressor and the fuel pump for furnishing air and fuel, respectively, to the burners is operated by means of hot gases tapped from a heating zone space of said main system, it will be apparent that the operation of the auxiliary turbine will be coordinated to the main elements of the plant merely by virtue of the arrangement shown. Compensation for working fluid tapped from the circuit by the auxiliary turbine is accomplished by injection thereinto from the combustion apparatus of hot combustion gases in like amount.

By providing for reheating of gases flowing in the turbine and pre- and inter-cooling of gases flowing through the compressor, the effective regenerating range is increased, as compared to an arrangement without reheating and without cooling, with the result that the efficiency is thereby improved.

While I have shown the invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What is claimed is:

1. The method of developing power by causing continuously-circulating products of combustion to go successively through cycles and wherein each cycle comprises primarily heating compressed circulating products of combustion by mixture therewith of hot products of combustion of like composition, expanding the heated and compressed circulating products of combustion incident to conversion of thermal energy thereof into mechanical energy, cooling the expanded circulating products of combustion, utilizing a portion of the mechanical energy to compress the expanded and cooled circulating products of combustion to provide the compressed products of combustion to be heated, effecting combustion by means of fuel and air to provide hot products of combustion for admixture with the compressed circulating products of combustion to effect heating of the latter, continuously releasing primarily heated products of combustion to control the accumulation of mass of the products of combustion being cycled, expanding the released products of combustion incident to conversion of thermal energy thereof into auxiliary mechanical energy, and utilizing this auxiliary mechanical energy to supply fuel and air for combustion under sufficient pressure so that the hot products of combustion may enter and admix with the circulating products of combustion.

2. The method of developing power by causing continuously-circulating products of combustion to go successively through cycles and wherein each cycle comprises primarily heating compressed circulating products of combustion by mixture therewith of hot products of combustion of like composition, expanding the heated and compressed products of combustion incident to conversion of thermal energy thereof into mechanical energy, cooling the expanded circulating products of combustion, utilizing a portion of the mechanical energy to compress the expanded and cooled circulating products of combustion to provide the compressed products of combustion to be heated, said cooling including the regenerative transfer of heat from the expanded circulating products of combustion to the compressed circulating products of combustion, effecting combustion by means of fuel and air to provide hot products of combustion for admixture with the compressed circulating products of combustion to effect heating of the latter, continuously releasing primarily heated products of combustion to control the mass of products of combustion being cycled, expanding the released products of combustion incident to conversion of thermal energy thereof into mechanical energy, and utilizing this auxiliary mechanical energy to provide fuel and air for combustion under sufficient pressure so that the hot products of combustion may enter and admix with the compressed circulating products of combustion.

3. The method of developing power by causing a continuously-circulating stream of products of combustion to go successively through cycles and wherein each cycle comprises primarily heating compressed circulating products of combustion by mixture therewith of products of combustion of like composition and of higher temperature, expanding the heated and compressed circulating products of combustion incident to conversion of thermal energy thereof into mechanical energy, cooling the expanded circulating products of combustion, utilizing a portion of the mechanical energy to compress the expanded and cooled circulating products of combustion to provide the compressed products of combustion to be heated, said cooling including the regenerative transfer of heat from the expanded circulating products of combustion to the compressed circulating products of combustion, effecting combustion by means of fuel and air supplied within the stream of compressed circulating products of combustion to provide hot products of combustion admixing with the compressed circulating products of combustion to heat the latter, continuously releasing a portion of the primarily-heated products of combustion to control the accumulation of mass of the products of combustion being cycled, expanding the released products of combustion incident to conversion of thermal energy thereof into auxiliary mechanical energy, and utilizing this mechanical energy to supply fuel and air for combustion under sufficient pressure so that the resulting hot products of combustion may enter and admix with the compressed products of combustion.

4. The method of developing power by causing a continuously-circulating stream of products of combustion to go successively through cycles and wherein each cycle comprises heating compressed circulating products of combustion; said heating including primary heating of the circulating products of combustion by mixture therewith of products of combustion of like composition and of higher temperature; expanding heated and compressed circulating products of combustion incident to conversion of thermal energy thereof into mechanical energy; cooling the expanded circulating products of combustion; utilizing a portion of the mechanical energy to compress the expanded and cooled circulating products of combustion in a plurality of stages to provide compressed products of combustion to be heated; said cooling including, first, the regenerative transfer of heat from the expanded circulating products of combustion to the compressed circulating products of combustion, second, precooling the expanded circulating products of combustion and, third, cooling the circulating products of combustion between stages of compression; effecting combustion by means of atomized fuel and air supplied within the stream of compressed and regeneratively-heated circulating products of combustion to provide the products of combustion of high temperature for primary heating of the products of combustion being cycled; releasing primarily heated products of combustion to control the accumulation of mass of the circulating products of combustion being cycled; expanding the released products of combustion incident to conversion of thermal energy thereof into auxiliary mechanical energy; and utilizing this auxiliary mechanical energy to supply atomized fuel and air for combustion.

5. The method of developing power by causing a continuously-circulating stream of products of combustion to go successively through cycles and wherein each cycle comprises heating compressed circulating products of combustion; expanding the heated and compressed circulating products of combustion incident to conversion of thermal energy thereof into mechanical energy; cooling the expanded circulating products of combustion; utilizing a portion of the mechanical energy to compress the expanded and cooled circulating products of combustion in a plurality of stages to provide compressed products of combustion to be heated; said cooling including, first, the regenerative transfer of heat from the expanded circulating products of combustion to the compressed circulating products of combustion, second, precooling the expanded circulating products of combustion and, third, cooling the circulating products of combustion between stages of compression; said heating comprising the regenerative addition of heat to the compressed circulating products of combustion followed by primary heating of the latter by mixture therewith of products of combustion of like composition and of higher temperature and reheating the products of combustion, after partial expansion, by mixture therewith of products of combustion of like composition and of higher temperature; effecting combustion by means of atomized fuel and air supplied within the stream of products of combustion after regenerative heating and before expansion and after partial expansion so that combustion of fuel supported by the air may occur within the stream to provide the products of combustion of higher temperature for primary heating and for reheating of the circulating products of combustion; continuously releasing primarily heated products of combustion to control the accumulation of mass of the products of combustion being cycled; expanding the released products of combustion incident to conversion of thermal energy into auxiliary mechanical energy; and utilizing this auxiliary mechanical energy to supply atomized fuel and air for combustion and under sufficient pressure so that the resulting hot products of combustion may enter and admix with the compressed circulating products of combustion.

6. In a power plant: a system wherein gaseous products of combustion continuously circulate and including a main prime mover having a flow passage for products of combustion serving as motive fluid; a main compressor driven by the main prime mover; a regenerator having first and second spaces separated by heat-conductive walls; means providing a first passage for supplying products of combustion from the main prime mover exhaust to the main compressor inlet and including said first spaces of the regenerator; and means providing a second passage for products of combustion returned from the main compressor outlet to the main prime mover inlet and including said second spaces of the regenerator, said main prime mover flow passage, and one or more heating zone spaces arranged between the regenerator and the main prime mover exhaust: combustion apparatus for delivering to the products of combustion flowing through each heating zone space hot products of combustion of like composition to effect primary heating of the first products: means for supplying combustion media to the combustion apparatus and including an auxiliary compressor and a fuel pump: means for driving the auxiliary compressor and the fuel pump and including an auxiliary prime mover connected to the auxiliary compressor: said auxiliary compressor having its inlet open to the atmosphere and said auxiliary prime mover discharging to the atmosphere: and means providing a third passage branching from the second passage following a heating zone space for delivering primarily heated products of combustion to the auxiliary prime mover inlet.

7. The combination as claimed in claim 6 with a precooler associated with the first passage for cooling products of combustion flowing from the regenerator to the compressor inlet.

8. In a power plant: a system wherein gaseous products of combustion continuously circulate and including a multiple-stage main turbine having a flow passage for products of combustion serving as motive fluid and the passage including an interstage heating zone; a main multiple-stage compressor driven by the main turbine; a regenerator having first and second spaces separated by heat-conductive walls; means providing a first passage for supplying products of combustion from the main turbine exhaust to the main compressor inlet and including said first spaces of the regenerator; means providing a second passage for products of combustion returning from the main compressor outlet to the main turbine inlet and including said second spaces of the regenerator, said main turbine flow passage including the heating zone space provided thereby, and a heating zone space arranged between the regenerator and the main turbine inlet: combustion apparatus for delivering to the products of combustion flowing through each heating zone space hot products of combustion of like composition to effect primary heating of the first products: means for supplying combustion media to the combustion apparatus and including an auxiliary compressor and a fuel pump: means for driving the auxiliary compressor and the fuel pump and including an auxiliary prime mover connected to the auxiliary compressor: said auxiliary compressor having its inlet open to the atmosphere and said auxiliary prime mover discharging to the atmosphere: and means providing a third passage branching from the second passage following a heating zone space for delivering primarily heated products of combustion to the auxiliary prime mover inlet.

9. The combination as claimed in claim 8 with means for precooling the products of combustion entering the compressor and for intercooling the products of combustion between successive stages of the compressor.

WINSTON R. NEW.